United States Patent [19]

Gruenberg

[11] Patent Number: 4,477,900

[45] Date of Patent: * Oct. 16, 1984

[54] SUCCESSIVE FRAME DIGITAL MULTIPLEXER WITH INCREASED CHANNEL CAPACITY

[75] Inventor: Elliot L. Gruenberg, West New York, N.J.

[73] Assignee: BroadCom, Incorporated, West New York, N.J.

[*] Notice: The portion of the term of this patent subsequent to Jul. 13, 1999 has been disclaimed.

[21] Appl. No.: 271,231

[22] Filed: Jun. 8, 1981

Related U.S. Application Data

[63] Continuation-in-part of Ser. No. 145,348, Apr. 30, 1980, Pat. No. 4,339,818.

[51] Int. Cl.³ .............................................. H04J 3/18
[52] U.S. Cl. .................................. 370/112; 370/118; 381/30
[58] Field of Search ................... 370/105, 110.1, 112, 370/118, 82; 375/109, 114, 25; 179/15.55 R, 15.55 T

[56] References Cited

U.S. PATENT DOCUMENTS

| | | | |
|---|---|---|---|
| 3,689,697 | 9/1972 | Smith, Jr. | 370/112 |
| 3,689,699 | 9/1972 | Brenig et al. | 370/112 |
| 3,700,820 | 10/1972 | Blasbalg et al. | 370/82 |
| 3,922,493 | 11/1975 | Brenig et al. | 370/110.1 |
| 4,339,818 | 7/1982 | Gruenberg | 370/112 |

Primary Examiner—Robert L. Griffin
Assistant Examiner—Stephen Chin
Attorney, Agent, or Firm—Lieberman, Rudolph & Nowak

[57] ABSTRACT

A digital multiplexer accommodates a large number of information signal channels per digital transmission channel through use of an improved statistical coding technique and successive frame transmission, the technique being based on channel designation and channel code permatation. The information signals are encoded into transmission code words, the code words are ordered into successive transmission frames and the transmission frames are sent over a communications highway to a remote location.

16 Claims, 12 Drawing Figures

BITS

| BIT POSITION | 5 | 6 | 1 | 2 | 3 | 4 | 5 | 6 | 1 | 2 → TIME |
|---|---|---|---|---|---|---|---|---|---|---|
| CHANNEL 1 | 0 | 0 | $a_0$ | $b_0$ | $c_0$ | 0 | 0 | 0 | $a_0$ | $b_0$ |
| 2 | 0 | 0 | 1 | $a_1$ | $b_1$ | $c_1$ | 0 | 0 | 1 | $a_1$ |
| 3 | $c_2$ | 0 | 1 | 0 | $a_2$ | $b_2$ | $c_2$ | 0 | 1 | 0 |
| 4 | $b_3$ | $c_3$ | 1 | 0 | 0 | $a_3$ | $b_3$ | $c_3$ | 1 | 0 |
| 5 | $a_4$ | $b_4$ | $c_4$ | 0 | 1 | 1 | $a_4$ | $b_4$ | $c_4$ | 0 |
| 6 | 1 | $a_5$ | $b_5$ | $c_5$ | 1 | 0 | 1 | $a_5$ | $b_5$ | $c_5$ |
| 7 | 1 | 0 | $a_6$ | $b_6$ | $c_6$ | 1 | 1 | 0 | $a_6$ | $b_6$ |
| 8 | 1 | 1 | 1 | $a_7$ | $b_7$ | $c_7$ | 1 | 1 | 1 | $a_7$ |

PROBABILITIES

| CHANNEL 1 | 0 | 0 | .009 | .009 | .009 | 0 | 0 | 0 | .009 | .009 |
|---|---|---|---|---|---|---|---|---|---|---|
| 2 | .003 | .003 | .003 | .006 | .006 | .006 | .003 | .003 | .003 | .006 |
| 3 | .006 | .003 | .003 | .003 | .006 | .006 | .006 | .003 | .003 | .003 |
| 4 | .003 | .003 | .002 | .002 | .002 | .003 | .003 | .003 | .002 | .002 |
| 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |

FIG. 9

SUCCESSIVE FRAME DIGITAL MULTIPLEXER WITH INCREASED CHANNEL CAPACITY

CROSS REFERENCE TO RELATED APPLICATION

This is a continuation-in-part application of application Ser. No. 145,348, filed Apr. 30, 1980, now U.S. Pat. No. 4,339,818, issued July 13, 1982.

FIELD OF THE INVENTION

This invention relates to digital multiplexers and more particularly to a digital multiplexer capable of accommodating a large number of voice channels per digital channel through use of an improved statistical coding technique, and successive framing of transmitted digital code words.

BACKGROUND OF THE INVENTION

Digital communications systems for the transmission of voice and data are becoming increasingly prevalent. This growth is exemplified by recent Bell System offerings, such as the Bell System's Advanced Communication System and numerous private common carrier offerings of digital service between major cities. An important factor in the use of the various private systems has been the advent of single channel CODEC units, such as the CODEC TP 3000 series. This unit permits digital transmission service to be provided at a bit rate as low as 64 KbS, making possible the use of microwave transmission bands previously available for analog service only.

The increase in digital service at lower bit rates has heightened the need for a digital multiplexer capable of accommodating a large number of analog channels per digital channel. One such multiplexer is shown in U.S. Pat. No. 3,492,932, granted to L. G. Schimpf on Jan. 27, 1970. In Schimpf three incoming analog channels are sampled and encoded into Pulse Code Modulation (PCM) signals by three individual five digit serial encoders. The serial encoder outputs are delayed by predetermined amounts to allow sampling of the time-coincident serial output bits in a predetermined sequence. Each group of successively sampled PCM bits is then converted into a Quantized Pulse Amplitude Modulated (PAM) signal which is representative of a sampled group of PCM bits. The QPAM signal is then transmitted to a receiving terminal where it is decoded into a plurality of respective PCM signals having bit patterns identical to the original encoded analog signals.

Although Schimpf achieves a reduction in intermodulation distortion and saves bandwidth, he requires the use of a separate PAM signal level for each possible combination of the "1" and "0" output bits of the PCM encoders, that is, Schimpf requires an eight level PAM signal to represent three analog channels. If, for example, 30 channels were to be accommodated by Schimpf's method $2^{31}$ or 10 Billion PAM levels would be required. It is apparent that if the number of PAM signal levels could be reduced from the maximum required by Schimpf a marked increase would be achieved in multiplexer capacity.

It is therefore an object of the present invention to improve the capacity of a digital multiplexer.

It is a further object of the present invention to provide a digital multiplexer accommodating the largest possible number of analog channels per digital channel.

It is an additional object of the present invention to transmit a plurality of analog signals over a single digital channel with a minimum amount of bandwidth.

It is a still further object of the invention to increase the number of voice analog channels which can be carried by a digital transmission medium (either cable or microwave) having a limited number of amplitude levels.

Finally, another more specific object of the invention is to transmit an increased number of voice frequency (voice and data) channels over T-1 carrier channels.

SUMMARY OF THE INVENTION

In accordance with the instant invention a plurality of input channels carry information signals for transmission over a communications highway. The information signals are encoded into a sequence of multibit digital words by encoders associated with each input channel.

It is a feature of the invention that the bit position of each multibit digital word is controlled at the output of the encoders such that a predetermined bit in each word is presented at different times to outputs of each of the encoders.

It is another feature of a first embodiment of the invention that the multibit digital words are converted into multibit digital code words, each bit of each code word being multiplied by a different analog voltage, and the analog voltages from each input channel being summed for transmission.

It is a still further feature of the invention that the summed analog voltages are converted into transmission code words, the transmission code words are ordered into successive transmission frames and the successive transmission frames are sent over a communications highway to a remote location.

It is an additional feature of another embodiment of the invention that the multibit digital code words, defining particular communication channels, are combined when more than one communication channel is being utilized to form unique channel designation code words for transmission.

The foregoing and other objects and features of this invention will be more fully understood from the following description of an illustrative embodiment thereof taken in conjunction with the accompanying drawings.

BRIEF DESCRIPTION OF THE DRAWINGS

In The Drawings:

FIG. 9 is a chart of typical bit probabilities in a sequential frame multiplexer system.

DETAILED DESCRIPTION

Figure 1:
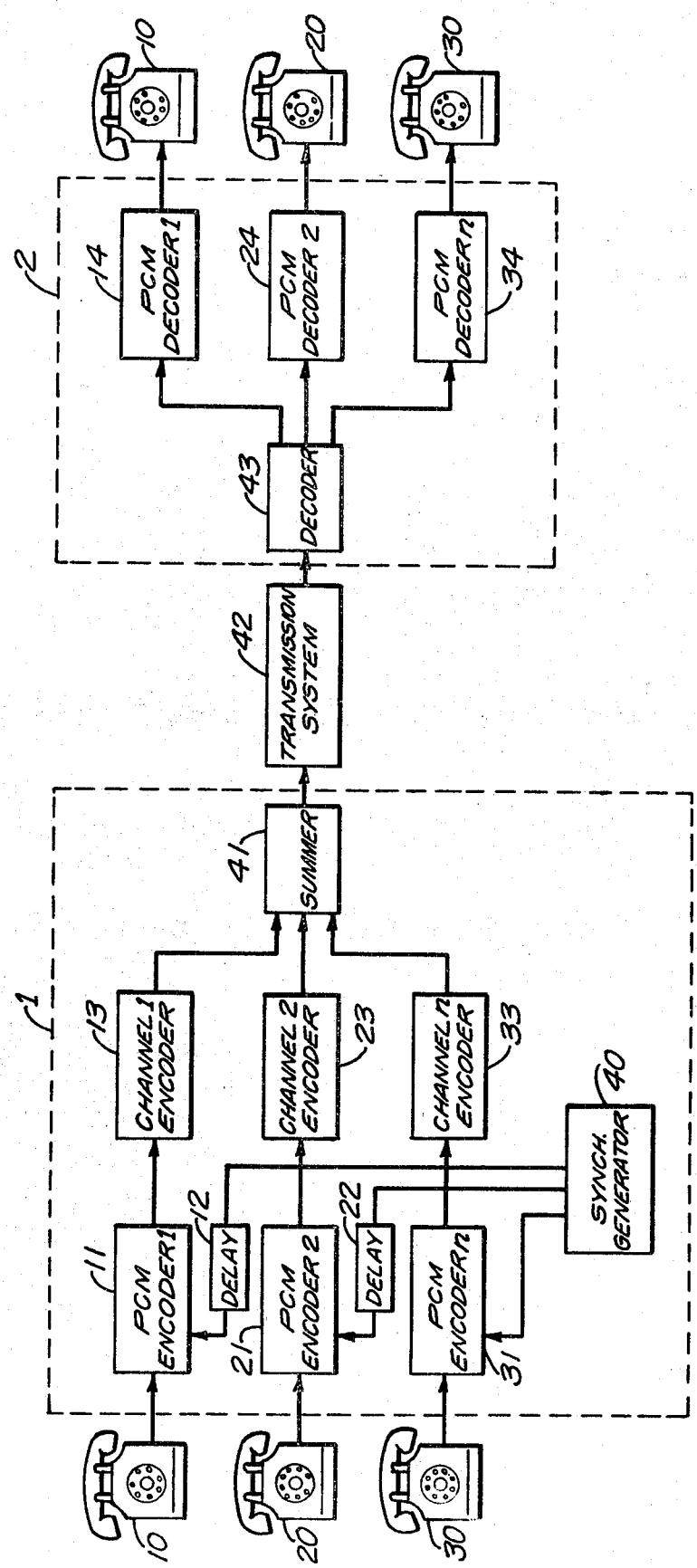
FIG. 1 illustrates, in block diagram form, a first embodiment of the invention.

It is helpful in understanding the features and advantages of the present invention to explain in somewhat greater detail the operation of the prior art Schimpf multiplexer. In Schimpf the outputs of the three PCM five-digit serial encoders are simultaneously presented at five parallel output leads. The first of the five parallel bits from each of the three encoders is applied to a gating circuit through delay circuitry such that the output of the gating circuit consists of the first three bits from all three encoders being outputted in sequence. This is followed by the second of the five parallel bits from all three encoders, etc. Each three bit sequence is then converted into one specific level of an eight level PAM signal. An example of this type of encoding is illustrated by the following table:

TABLE I

| CHANNEL NO. | 1 | 2 | 3 | Output Code |
|---|---|---|---|---|
| Possible Output | 0 | 0 | 0 | 0 |
| From Three PCM | 1 | 0 | 0 | 1 |
| Encoders | 0 | 1 | 0 | 2 |
|  | 1 | 1 | 0 | 3 |
|  | 0 | 0 | 1 | 4 |
|  | 1 | 0 | 1 | 5 |
|  | 0 | 1 | 1 | 6 |
|  | 1 | 1 | 1 | 7 |

As illustrated a unique output code is generated for each possible combination of encoder outputs. However, if the expectation would be that no more than one logical "1" bit would be present at any channel output the PAM encoder would only be required to produce a signal having one amplitude level for each channel i.e., a three level PAM signal for three channels. Stated another way, if simultaneous "1" bits from the three PCM encoders could be eliminated, then only the channel having a logical "1" output would have to be identified by the multilevel PAM signal. The result would be the representation of a greater number of analog channels with the same PAM signal than was possible with prior art digital multiplexers. The instant invention accomplishes this objective by making the frequency of multiple simultaneous "1" bits extremely small.

The frequency of logical "1" bits in a PCM encoder output, when used for the transmission of voice, is dependent upon:
1. The frequency of conversation.
2. The two-way effect i.e., only one speaker is usually talking.
3. Gaps in speech during conversation.
4. The probability of particular levels being reached in the amplitude encoding.

The first three factors affect the probability that any channel is being used at all. An estimate of such utilization depends upon traffic experience and a figure of 0.07 to 0.25 is a reasonable average representing the probability of a logical "1" bit existing in any channel.

The fourth factor depends upon the amplitude statistics of the voice level. An expression for the Probability Density Function (P.D.F.) of this amplitude is:

$$P(x) = \frac{1}{\sqrt{2}} \sigma \exp\left(-\sqrt{2}\, \frac{x}{\sigma}\right) \quad \text{(Eq 1)}$$

where
- x = instantaneous speech voltage level
- σ = RMS speech voltage
- |x| = absolute value of positive or negative voltage level, and
- P(x) = probability of a plus or minus level. Equation 1 has been found to accurately model the statistics of telephone signals from a wide range of speakers, i.e. weak and strong speakers, etc. For this to be used as a basis for digitally encoding and transmitting telephonic signals it is necessary to establish maximum, average and minimum amplitude levels so as to reproduce the signals with minimum acceptable distortion and error. The maximum signal above which an encoder will encode as the maximum signal, not the actual value of the maximum signal is called the cutoff voltage. Actual voltage and experimentation has shown that the RMS speech voltage should be approximately 1/45 of the cutoff amplitude.

Assume for purposes of describing the instant invention that there are seven analog input channels. Each of these channels will be governed by its P.D.F. determined by Equation (1). Each amplitude sample of these channels will be quantized into a PCM code, each bit of which is transmitted in a sequence. In accordance with the prior art shown in Table I, seven analog channels would require one of $2^7$ or 128 amplitude levels to transmit all of the possible code combinations in each bit period. The present invention makes use of the fact that all of these combinations will not occur because of the statistical factors noted above. Specifically the speech signals are quantized in accordance with Equation (1) in a manner which provides acceptable distortion proportionate to amplitude level and acceptably encodes the weakest signal.

To accomplish this, it is presently known to divide the amplitude range into eight positive and negative intervals or segments, respectively. See for example pgs. 571–585, "Transmission Systems for Communications" Bell Telephone Laboratories, 4th Edition, 1970. These segments are not uniform but each segment, starting from the lowest amplitude segment is twice as large as the next lowest amplitude interval. The probability that the speech amplitudes from a given talker will lie in a given segment is given in Table II which has been calculated from the P.D.F. of Equation 1. For a signal to be counted in level 0, rather than at zero level, it is assumed to have an amplitude greater than one-eight or one-sixteenth of the 0 level amplitude range, depending on the quantization interval used.

TABLE II

| Level + Or − | Probability |
|---|---|
| 1 | 0.1959 |
| 2 | .119 |
| 4 | .117 |
| 8 | .059 |
| 16 | .009 |
| 32 | .0002 |
| 64 | Negligible |
| 128 | Negligible |

It is important to note how infrequently levels above the third level occur.

This infrequency of the higher level of segments of the speech signal means that channels operating at segment levels 4, 5, 6, and 7 will not be sending code bits coinciding with levels 0, 1, 2 and 3. This statistical feature of the voice signal is one of the ways used to reduce the transmission levels required from 128 (for our seven channel example) to a number approaching seven.

To further this objective the signal may be encoded with a code which would require no more than one level or one bit (plus sign bit) per each code as shown in Table III.

TABLE III

| Level | + or − | Bit Position | | | | | |
|---|---|---|---|---|---|---|---|
| | | 1 | 2 | 3 | 4 | 5 | 6 |
| 0 | 0 | 0 | 0 | 0 | 0 | 0 | 0 |
| 1 | 1 | 0 | 0 | 0 | 0 | 0 | 0 |
| 2 | 2–3 | 0 | 0 | 0 | 0 | 0 | 1 |
| 3 | 4–7 | 0 | 0 | 0 | 0 | 1 | 0 |
| 4 | 8–15 | 0 | 0 | 0 | 1 | 0 | 0 |
| 5 | 16–31 | 0 | 0 | 1 | 0 | 0 | 0 |
| 6 | 32–63 | 0 | 1 | 0 | 0 | 0 | 0 |
| 7 | 64–128 | 1 | 0 | 0 | 0 | 0 | 0 |

Use of this code insures that only one bit from each channel would be present during each bit position for the seven amplitude bits. An eighth bit for sign would also be sent. This coding may be used where voice quality is found acceptable. Additional levels and bit positions may be used to improve signal fidelity, or additional coding described below may be used.

The overall probabilities that any of these bits would be sent are the products of the channel utilization probabilities and the level probabilities of Table II. They are shown in Table IV.

TABLE IV

| Level No. | Bit Probability (Utilization P = .1) |
|---|---|
| 0 | .01959 |
| 1 | .0119 |
| 2 | .0117 |
| 3 | .0059 |
| 4 | .0009 |
| 5 | .000017 |
| 6 | Negligible |
| 7 | Negligible |

The sign bit probability would be the probability of a level bit multiplied by 0.5, since there is a 50% probability of either a positive or negative value, of any level.

The probability of a bit occurring in any two channels for activity which is uncorrelated (which is overwhelmingly the general case), is the product of level probabilities in the two channels. The total probability of any two bits would be the sum of these probabilities.

If the parallel channels were channel synchronized so that bit position 8, for example, would occur at the same time in all channels the probability of coincidence in this position would be enhanced because level 1 is by far the most probable. In the present invention, however, the bit position is deliberately staggered so that bit position 8 occurs at a different time in each channel as shown below in Table V.

TABLE V

| Channel | BIT POSITION | | | | | | | | Interval | | | |
|---|---|---|---|---|---|---|---|---|---|---|---|---|
| | 1 | 2 | 3 | 4 | 5 | 6 | 7 | 8 | 1 | 2 | 3 4 5 6 7 8 |
| 1 | 1 | 2 | 3 | 4 | 5 | 6 | 7 | 8 | 1 | 2 | 3 4 5 6 7 8 |
| 2 | 8 | 1 | 2 | 3 | 4 | 5 | 6 | 7 | 8 | 1 | 2 3 4 5 6 7 |
| 3 | 7 | 8 | 1 | 2 | 3 | 4 | 5 | 6 | 7 | 8 | 1 2 3 4 5 6 |
| 4 | 6 | 7 | 8 | 1 | 2 | 3 | 4 | 5 | 6 | 7 | 8 1 2 3 4 5 |
| 5 | 5 | 6 | 7 | 8 | 1 | 2 | 3 | 4 | 5 | 6 | 7 8 1 2 3 4 |
| 6 | 4 | 5 | 6 | 7 | 8 | 1 | 2 | 3 | 4 | 5 | 6 7 8 1 2 3 |

When the small errors caused by levels 1 and 2 bit coincidence can be tolerated, then only the number of the channel carrying the bit need be sent and transmission would be typified by the following channel number sequence:

7 0 0 4 0 2 0 1 2 7 6

When greater error immunity is desired, it would be necessary to provide code numbers for the cases when two channels may be transmitting bits. The codes are, for example:

TABLE VI

| Code | Channel | Code | Channel | Code | Channel |
|---|---|---|---|---|---|
| 1 | 1 | 9 | 1 and 2 | 16 | 2 and 3 |
| 2 | 2 | 10 | 1 and 3 | 17 | 2 and 4 |
| 3 | 3 | 11 | 1 and 4 | 18 | 2 and 5 |
| 4 | 4 | 12 | 1 and 5 | 19 | 2 and 6 |
| 5 | 5 | 13 | 1 and 6 | 20 | 2 and 7 |
| 6 | 6 | 14 | 1 and 7 | 21 | 2 and 8 |
| 7 | 7 | 15 | 1 and 8 | | |
| 8 | 8 | | | | |
| 22 | 3 and 4 | 27 | 4 and 5 | 31 | 5 and 6 |
| 23 | 3 and 5 | 28 | 4 and 6 | 32 | 5 and 7 |
| 24 | 3 and 6 | 29 | 4 and 7 | 33 | 5 and 8 |
| 25 | 3 and 7 | 30 | 4 and 8 | 34 | 6 and 7 |
| 26 | 3 and 7 | | | 35 | 6 and 8 |
| | | | | 36 | 7 and 8 |

The advantage of the coding of the instant invention over ordinary pulse amplitude modulation (PAM) is that the same information can be transmitted with much lower power levels. Alternatively, more channels may be transmitted with the same power. For example, a $10^{-4}$ error rate (approximately) will result if 16 channels are sent as follows: 36 codes as in Table VI above, 36 to be used to send the first set of eight channels, plus eight additional codes for the second set of channels making a total of 44 codes. The error rate is principally caused by the coincidence of level 1, Table IV, in two channels. The advantage with respect to PCM coding is that many more voice channels may be transmitted over the same bandwidth.

What has been just described is the theoretical basis for what is called the Digital Multiplexer With Improved Channel Capacity (DMIC), now described in U.S. Pat. No. 4,339,818, the parent of the instant application. The DMIC provides for multiple level digital transmission of signals, the levels representing different channel sources whereas bit positions represent digital PCM code representation of amplitude samples of the analog sources. Transmission across several media, such as T-1 carrier channels is limited to a few levels. The T-1 channels operate on three levels 1, 0, −1. Described below is a Successive Frame Digital Multiplexer With Improved Channel Capacity (SFDMIC) which provides a new method for transmitting multilevel information on such limited level media while still preserving and enhancing the bandwidth conserving characteristics of the DMIC.

In SFDMIC, the channel marking of bits remains the same but the required magnitude to denote the channel is decomposed into its lower modulo representation and successive frames of information are sent. Ternary representation is preferred so that channels will be denoted, as for example, in Table VII.

TABLE VII

| Channel | Ternary Levels In | |
|---|---|---|
| | Frame 1 | Frame 2 |
| 1 | 1 | 0 |
| 2 | 1 | 1 |
| 3 | 1 | −1 |
| 4 | 0 | 1 |
| 5 | 0 | −1 |
| 6 | −1 | 0 |
| 7 | −1 | 1 |
| 8 | −1 | −1 |

The first modulo term is sent in the first frame and the second term in a second frame at the same bit code position. For example, the levels in Table VIII are decomposed in accordance with the code of Table VII to produce the two frames of Table IX which can be restored back to Table VIII.

More particularly channel 2 in Table VIII is represented by the number 2 on the transmitted frame of channel numbers. Table VII indicated that channel 2, whenever there is a bit occurrence in this channel, is designated by a +1 in frame 1 and a +1 in frame 2. Table IX shows the resulting frames (transmitted channels) and the format of sequential frame transmission.

The two frame ternary code can accommodate $3^2 - 1 = 8$ channel designations, while a three term (or frame) may designate $3^3 - 1 = 26$ channels.

TABLE VIII

| | Multilevel DMIC Frame (Examples) | | | | | | |
|---|---|---|---|---|---|---|---|
| | Bit Position | | | | | | |
| Channel | 1 | 2 | 3 | 4 | 5 | 6 | 7 |
| 1 | 0 | 0 | 0 | 0 | 0 | 0 | 0 |
| 2 | 0 | 0 | 2 | 0 | 2 | 0 | 2 |
| 3 | 0 | 0 | 0 | 0 | 0 | 0 | 0 |
| 4 | 4 | 0 | 0 | 4 | 0 | 4 | 0 |
| 5 | 0 | 0 | 0 | 0 | 0 | 0 | 0 |
| 6 | 0 | 0 | 0 | 0 | 0 | 0 | 0 |
| Transmitted Frame of Channel Nos. | 4 | 0 | 2 | 4 | 2 | 4 | 2 |

TABLE IX

| | Sequential Frame SFDMIC Two Frame Examples | | | | | | | | | | | |
|---|---|---|---|---|---|---|---|---|---|---|---|---|
| | Frame 1 Bit Position | | | | | | | Frame 2 | | | | |
| Channel | 1 | 2 | 3 | 4 | 5 | 6 | 7 | 1 | 2 | 3 | 4 5 6 7 |
| 1 | 0 | 0 | 0 | 0 | 0 | 0 | 0 | 0 | 0 | 0 | 0 0 0 0 |
| 2 | 0 | 0 | 1 | 0 | 1 | 0 | 1 | 0 | 0 | 1 | 0 1 0 1 |
| 3 | 0 | 0 | 0 | 0 | 0 | 0 | 0 | 0 | 0 | 0 | 0 0 0 0 |
| 4 | 0 | 0 | 0 | 0 | 0 | 0 | 0 | 1 | 0 | 0 | 1 0 1 0 |
| 5 | 0 | 0 | 0 | 0 | 0 | 0 | 0 | 0 | 0 | 0 | 0 0 0 0 |
| 6 | 0 | 0 | 0 | 0 | 0 | 0 | 0 | 0 | 0 | 0 | 0 0 0 0 |
| Transmitted Frame of Channel Nos. | 0 | 0 | 1 | 0 | 1 | 0 | 1 | 1 | 0 | 1 | 1 1 1 1 |

The successive frames, on reception, are stored in a register and then decoded into a single number for decoding by a flash A to D converter (the A/D converter is one method of providing "1" bits to the correct channels as to be described in more detail later).

Table X shows the number of voice frequency (input) channels designatable by several frames ($7n$) of binary, ternary and quaternary codes.

TABLE X

| No. of Frames | BINARY | TERNARY | | QUATERNARY | |
|---|---|---|---|---|---|
| $F_n$ | $2F_n$ | $F_n$ | $3F_n$ | $F_n$ | $4F_n$ |
| 2 | 4 | 2 | 9 | 2 | 16 |
| 3 | 8 | 3 | 27 | 3 | 64 |
| 4 | 16 | 4 | 81 | 4 | 256 |
| 5 | 32 | 5 | 243 | 5 | 1024 |
| 6 | 64 | 6 | 729 | 6 | 4096 |
| 7 | 128 | 7 | 2187 | 7 | 6384 |
| 8 | 256 | 8 | 6561 | 8 | 65536 |
| 9 | 512 | 9 | 19683 | 9 | 262144 |
| 10 | 1024 | 10 | 59049 | 10 | 1049576 |
| 11 | 2048 | | | | |
| 12 | 4096 | | | | |
| 13 | 8192 | | | | |
| 14 | 16384 | | | | |

The binary code is commonly used for T-1 carrier wireline service, the ternary code could also be used for such services and all of the codes may find use in other services. The quaternary, in particular, is useful in microwave service.

If all of the designatable channels are used the number of channels transmittable increases much more rapidly then the additional time (code) frames required, providing a considerable improvement in use of bandwidth. This improvement is available when utilization of channels is low because the probability of conflicting channel bits depends on the probability of a bit occupying a time position. This probability is $P_B = P_{BL} P_U$ $P_{BL}$ = Probability of a bit in coding position L
$P_U$ = Probability of a sample word The probability of a bit conflict between channels is $$P_{CB} = (P_B)c$$

where c is the number of conflicting channels.

The frequency of bit conflicts $F_c$ increases with number of channel combinations.

Thus for C=2

$$(F_C) = P_B^2 \frac{(n(n-1))}{2}$$

and for C=3

$$(F_C) = P_B^3 \frac{(n(n-1)(n-2))}{6}$$

The sum of these conflict frequencies constitute the total probability of error. However when $P_B$ is sufficiently small the main contribution is the C=2 term and when the number n of channels is high, this term will become important. A number of computations of C=2 combinations are given in Table XI. The C=2 conflicts will cause no conflicts if the multiplexer codes all the channel combinations, as pointed out in connection with Table VI. Note that the provision of more frames greatly increases the capability of designating the channels and the combinations of channels by the transmitted codes of Table X.

TABLE XI $$n_C = \frac{n(n-1)}{2}$$

| n = No. of Channels | $n_C$ = No. of 2 Chl Conflicts | $n_C + n$ |
|---|---|---|
| 2 | 2 | 3 |
| 3 | 3 | 6 |
| 4 | 6 | 10 |
| 4 | 6 | 10 |
| 5 | 10 | 15 |
| 8 | 28 | 36 |
| 10 | 45 | 55 |
| 13 | 78 | 91 |
| 20 | 190 | 210 |
| 40 | 780 | 830 |
| 60 | 1770 | 1830 |

In Table XII C=3 combinations are shown as well as computations of frequency of conflict for $P_B=1/300$. However, because $(P_B)^3$ is small when $P_B=1/300$ the frequency of conflict is sufficiently small to ignore even if 40 to 60 channels are sent.

In these calculations $P_B$ was considered equal for all conflicting channels. However the DMIC and SFDMIC provides for the staggering of the channels in bit code position, as in Table V.

TABLE XIII $$(n_C)_3 = \frac{n(n-1)(n-2)}{6}$$

| n Chls | $(n_C)_3$ | $n_C$ | $F_C = (n_C)_B(P_B)^3$ |
|---|---|---|---|
| 10 | $\frac{(10)(9)8}{6}=$ | 120 | $4.6 \times 10^{-6}$ |
| 20 | $\frac{(20)(19)(18)}{6}$ | 1140 | $4.5 \times 10^{-5}$ |
| 40 | $\frac{(40)(39)(38)}{6}$ | 9880 | $3 \times 10^{-4}$ |
| 60 | $\frac{(60)(59)(58}{6}$ | 34220 | $1 \times 10^{-3}$ |

In this case the $P_B$'s of the two conflicting channels are unequal, the probability $P_{BL}$ of the higher levels being very low. This will reduce the number of effectively conflicting channels from the n(n−1)/2 combinations previously calculated for C=2. The levels of sufficiently high probability are estimated to be 3. As an example consider the case of seven channels. Only channels 1 and 2, 2 and 3, and 1 and 3 will conflict sufficiently frequently to require encoding separately or only 3 channels, instead of n(n−1)/2=21 channels. Thus staggering greatly reduces the conflicts. In 49 channels there will be 7×3=21 potentially conflicting channels with 21×20/2=210 combinations instead of (49×48)/2=1176. This reduction permits reducing the required successive frames to 5, when ternary coding the channels and channel combinations for T-1 transmission. This means that the transmission bandwidth reduction is 49/5≈10. If the transmission medium can sustain only two levels so that binary encoding is required than 49 channels and the 210 conflicts will require approximately 256 (259) codes which is $2^8$ (see Table X) or 8 successive frames. This represents a bandwidth improvement factor of 49/8=6. In practice, as shown below, it is desirable to send positive and negative samples by separate codes. This result may slightly lower the improvement factor. The bandwidth saving features of this invention are discussed in more detail below. Similarly the C=3 conflicts are also greatly reduced.

Specific embodiments of the DMIC and SFDMIC will now be described based on the above novel operating principles.

FIG. 1 illustrates an overall view of a digital communications system in accordance with the instant invention. Incoming analog signals are generated by telephones 10, 20 and 30, and applied to PCM encoders 11, 21 and 31 included in multiplexer 1. Each telephone represents a separate input channel and a separate PCM encoder is provided for each channel. Although only three input channels are shown it will be understood that any number of channels can be provided. PCM encoders 11, 21 and 31 encode the voice frequency signals into a serial digital work in a manner well known in the art. A representative PCM encoder is illustrated in the patent to Schimpf for encoding video information. For voice, however, eight bit encoders are used which compress the range input amplitudes before coding. Such encoders are useful in this invention. In the particular embodiment shown in FIG. 1, the PCM encoders preferably sample the voice frequency signals at an 8 Khz rate and serially convert this sample into an 8 bit digital work. Encoder operation is controlled by synch generator 40 which controls the channel start time of the PCM code, i.e., the time each bit in the PCM digital word is presented to the encoder output.

Synch generator 40 provides channel synch pulses which are coincident with bit position 8 in the 8-bit serial word. Each PCM encoder receives this synch pulse delayed by a separate and predetermined interval of time equal to a different number of bit positions. The required delay is provided by delay units 12 and 22. Controlling the synchronization of each PCM encoder in this manner ensures the bit-8 of each PCM code commences at a different time. This advantageously achieves the necessary bit staggering illustrated in Table V.

The output of each PCM encoder is presented to channel encoders 13, 23 and 33. It is the function of the channel encoders to convert the output from each PCM encoder into the code illustrated in Table III, hereinafter referred to as the nearest bit approximate code. Such a conversion is readily accomplished by storing the PCM code in a register, examining the PCM code with appropriate digital logic or a properly programmed microprocessor to establish the numerical range of the code, and generating the nearest bit approximate code to replace the PCM code. As the circuitry necessary to perform such a conversion is well known to one skilled in the art of digital logic design the circuit details will not be further described. The nearest bit approximate code is generated once per 8-bit interval and placed in an output register (not shown).

The code illustrated in Table III contains a single "1" bit for each of the 8 input channels. Each of the channel encoders 13, 23 and 33 further include circuitry, such as illustrated in the patent to Schimpf, which successively multiplies each bit from each channel with a calibrated analog voltage unique to the particular channel represented by that bit. Thus channel encoder 13 would operate on the nearest bit approximate code stored in the output register and multiply channel 1 by a level 1 calibrated voltage, encoder 23 would multiply channel 2 by a level 2 analog voltage, etc. The outputs from the channel encoders are summed for each bit interval by summer 41. Since no more than one channel is expected to supply a non zero output, the output of summer 41 for each bit position will be either a zero or a number (level) corresponding to the transmitting channel.

The output of summer 41 is sent via transmission system 42. This system may include modulation means to convert the amplitude coded signals to frequency or phase modulation or to modulate a frequency link. The instant embodiment can be utilized with any transmission system capable of accepting a PAM signal.

At the receiving end the demodulated amplitude coded signals are decoded by decoder 43 included in demultiplexer 2. Decoder 43 is calibrated to convert the PAM signals into a parallel binary code. It does this by comparing the amplitudes occurring in each bit interval with standard voltages. When voltages lie in the specific correct range a comparator for that voltage will generate a "1" bit. For example, if the amplitude 2 is received a comparator will set a "1" bit if the number is greater than $1\frac{1}{2}$, but the comparator will change this bit to zero if the voltage is greater than $2\frac{1}{2}$. Thus, the comparator system would generate a "1" bit for channel 2 if and only if a value close to value of level 2 had been received. Such decoders are well known in PAM systems (see the Schimpf patent) and will not be further detailed herein. The output of decoder 43 comprises a number of binary bits which indicate the correct channel numbers transmitted and these bits are placed in an output register (not shown) having a separate position for each channel. The register is interrogated by a sampling pulse at a rate greater than the bit position transmission rate. Each position of the register is connected to separate PCM decoders 14, 24, 34. These decoders convert the coded signals to voice frequency signals, which can properly activate the earpieces of telephones 10, 20 and 30.

The embodiment just described assumes that only one channel is supplying a non-zero output. When two channels transmit, which is rare, an error will occur. If the resultant low error rate cannot be tolerated the embodiment shown in FIG. 2 can be used to provide greater error immunity.

Figure 2:
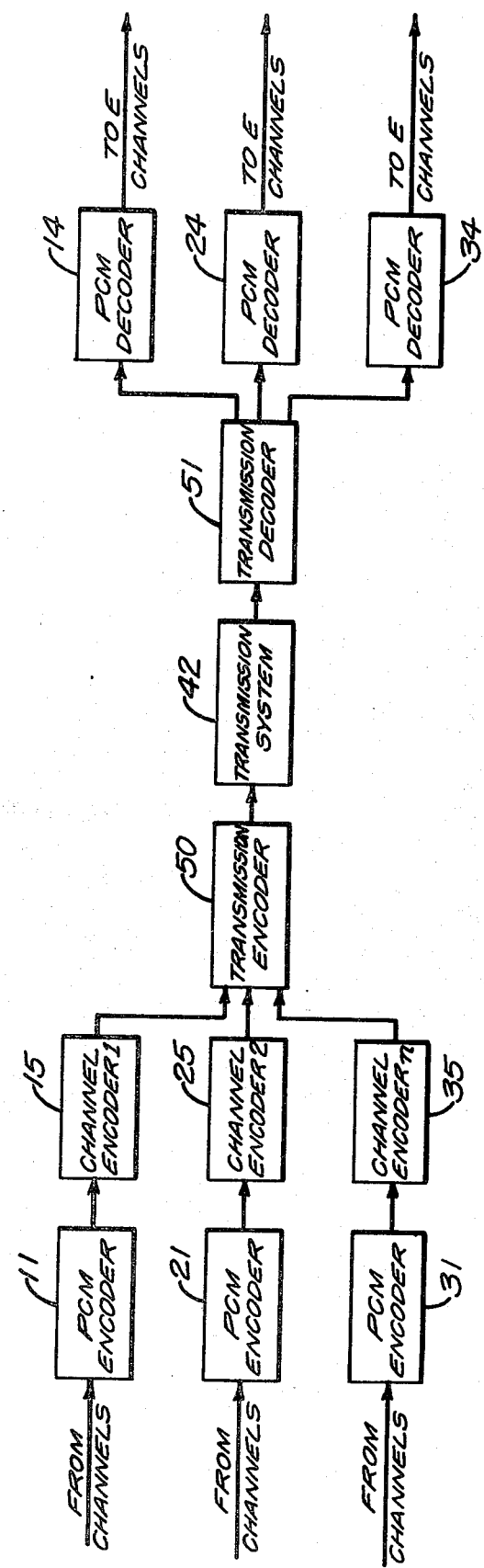
FIG. 2 illustrates a second embodiment of the invention to achieve greater error immunity.

Table VI illustrates the coding utilized to provide greater error immunity and this coding scheme is implemented by the system shown in FIG. 2. In FIG. 2 channel encoders 15, 25 and 35 replace the encoders 13, 23 and 33 of FIG. 1. Encoders 15, 25 and 35 perform only the function of converting standard PCM codes to the nearest bit approximate code but do not multiply the code with the channel indentifying amplitude voltage. Summer 41 is replaced by transmission encoder 50.

Transmission encoder 50 interrogates each channel encoder register bit and determines in which channel "1" bits are present. The encoder than generates an appropriate code pursuant to Table VI. The code generator of encoder 50 can be implemented in a number of ways. For example, a Read Only Memory (ROM) could be used as a look-up table to generate the proper code in response to the presence of "1" bits in the various channels. The correct PAM level is then produced in response to the generated code and is done in the manner taught by Schimpf i.e., the described voltage level is generated by a voltage divider fed from a standard voltage which operates on each "1" bit in the output code. As the operation of encoder 50 is apparent to one skilled in the art further circuit details will not be given. Transmission decoder 51 decodes the transmitted PAM signals through use of an appropriate PAM decoder and ROM. Encoders 11, 21 and 31 and decoders 14, 24 and 34 function in the manner described above.

The embodiments of the invention just described greatly improve system efficiency over prior art multiplexers such as shown in Schimpf. However even greater efficiency can be achieved through use of a positive and negative coding scheme.

Figure 3A:
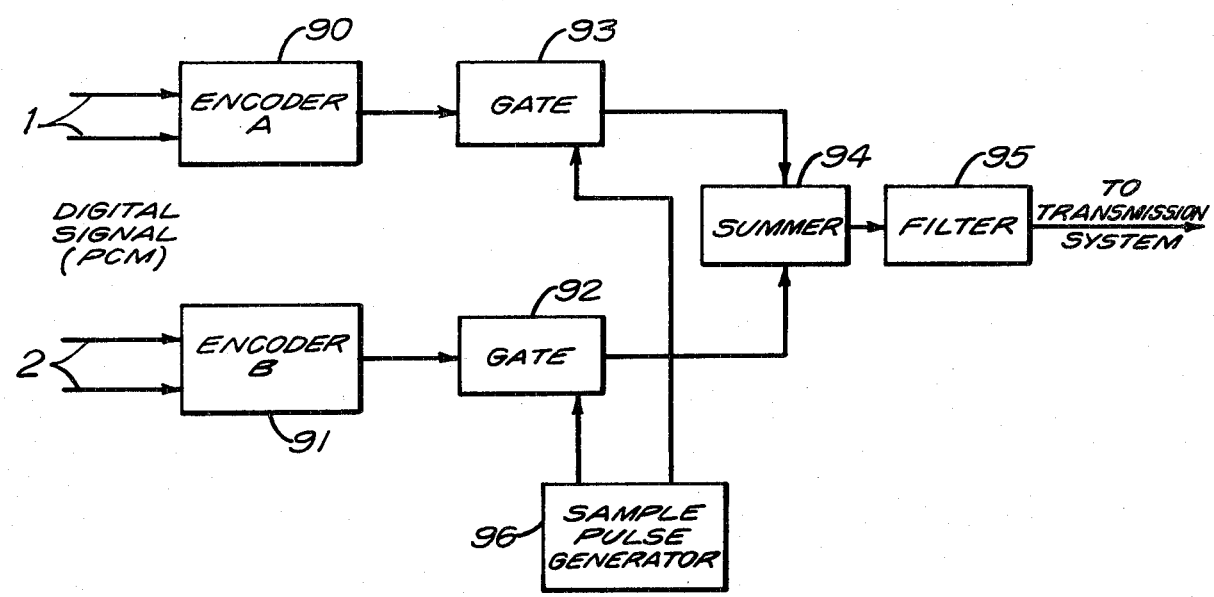
FIGS. 3A and 3B illustrate another embodiment of the invention directed to plus and minus coding techniques.

The objective of the positive and negative coding scheme is to permit the combined transmission from two encoders over a common transmission band while providing separate recovery from each encoder. Referring to FIG. 3A, encoder 90 accepts PCM signals such as are produced by PCM encoders 11, 21 and 31 and generates PAM signals in accordance with the teachings described above. However the PAM outputs from encoder 90 are transmitted by generally positive going signals. Encoder 91 also accepts PCM signals and generates PAM signals in accordance with the instant invention. However, the PAM outputs from encoder 91 are transmitted by generally negative going signals.

The PAM outputs from encoder 90 are applied to gate 93 which is selectively enabled by pulse generator 96 to sample the leading half of the PAM bit interval. The output of gate 93 is fed to summer 94. At the same time the PAM outputs from encoder 91 are applied to gate 92 which is selectively enabled by pulse generator 96 to sample the lagging half of the PAM bit interval. The outputs from gate 92 are also applied to summer 94. It is of course appreciated that the negative going pulses from encoder 91 are generated by using a negative rather than a positive standard voltage. FIG. 3C shows a typical output of summer 94. A bit interval is twice the encoder(A) 90 or encoder(B) 91 pulse widths. Encoder 90 pulses are always positive and encoder 91 pulses always negative. Filter 95 changes the half bit interval pulses into approximately half sine waves occupying a full bit interval as shown in the upper diagram of FIG. 3D. The actual output is the sum of these pulses as shown in the lower diagram of FIG. 3D. This diagram shows that true values of encoder 90 pulses occur at regular intervals which are a bit interval $T_B$ apart and are positive. While true encoder 91 pulse amplitudes also occur at $T_B$ intervals, they are negative and these intervals are separated by $T_{B/2}$ from the encoder 90 pulses. Thus, no increase in bandwidth has occurred even though twice the number of channels is accommodated.

Figure 3B:
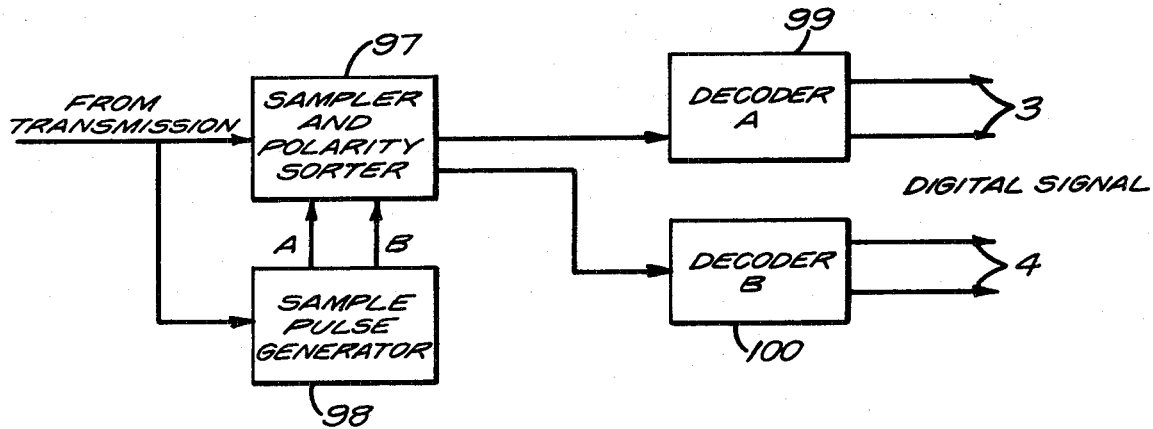
Figure 3C:
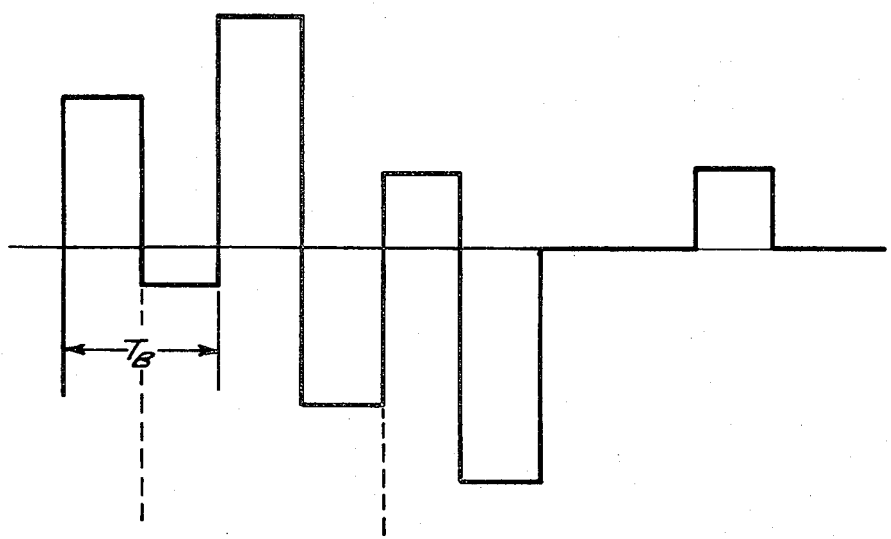
FIGS. 3C and 3D illustrate wave forms occurring in the embodiment of FIGS. 3A and 3B.
Figure 3D:
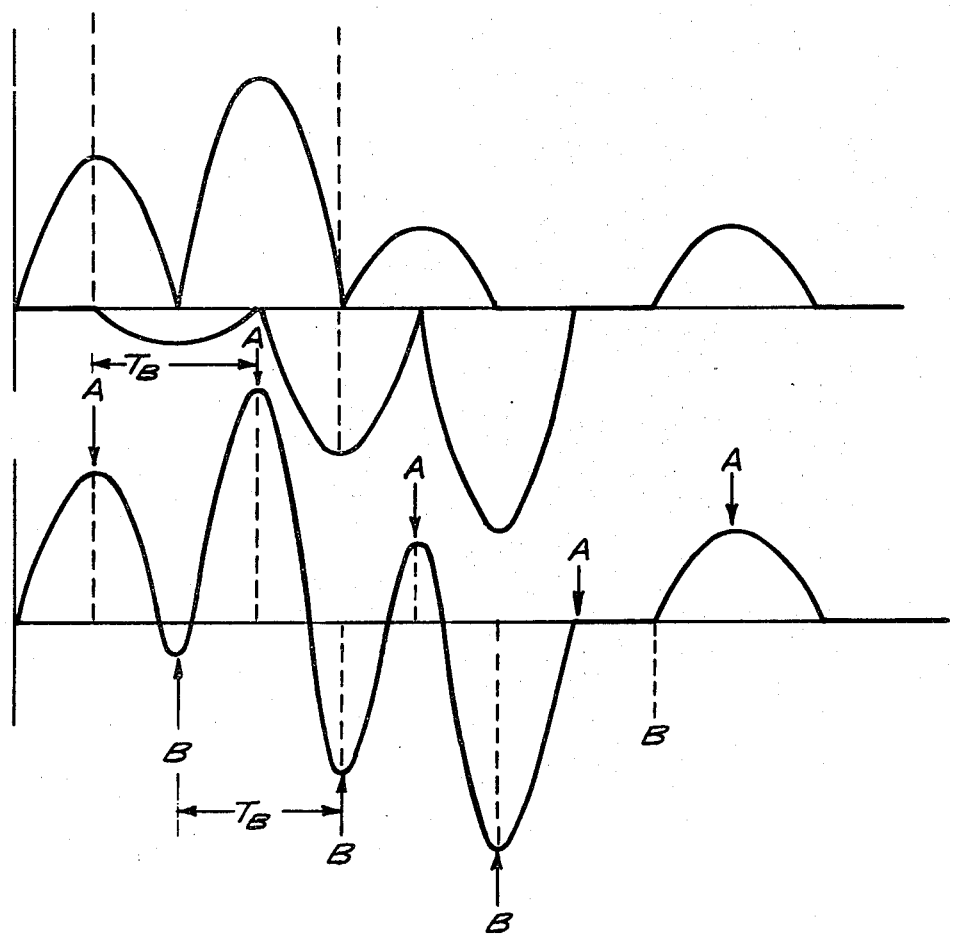

FIG. 3B illustrates a preferred decoder implementation. Sampling generator 98 is synchronized to the incoming pulse rate (bit rate). Using pulses from 98, sorter 97 samples the incoming signal at the decoder (A) 99 intervals and the decoder (B) 100 intervals. When decoder 99 intervals are sampled sorter 97 permits positive signals to be sent to decoder 99. Decoder 99 converts these pulses into a multichannel PCM signal output. At encoder (B) 100 intervals, which occur $T_{B/2}$ after encoder 99 intervals, generator 98 samples the incoming signal and derives true negative pulse values which are then passed on to decoder 100. Decoder 100 converts these signals into PCM signals for conversion to voice signals.

Figure 4:
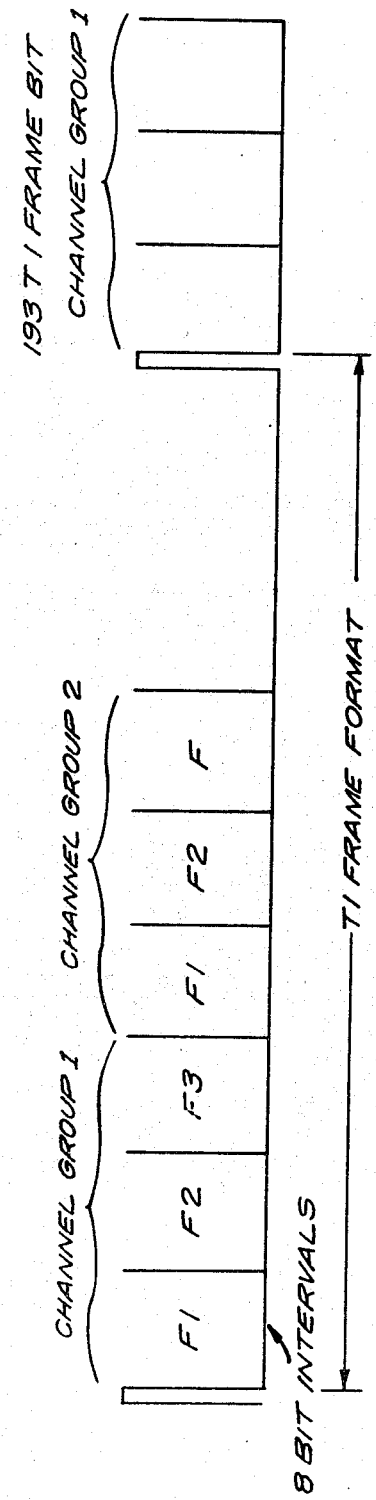
FIG. 4 illustrates timing sequences for a sequential frame multiplexer in accordance with the invention.

Turning now to the successive frame DMIC, this embodiment of the invention requires the use of several successive time frames normally reserved for channel words to transmit a group of channels as shown in FIG. 4. The number of channels transmitted however increases far more rapidly than the required channel frames, as previously indicated. FIG. 4 shows three frames forming Channel Group 1, which actually is transmitting approximately 13 analog channels when allowing codes for conflicts as described above. Were no conflicts coded the number of analog channels accomodated by the group of channels would be 27. (See Table X). Binary transmission coding would require approximately five frames for transmitting the same information. Each Frame F is 8 bit intervals, Frame $F_1$ transmits the first ternary code component of the channel word, $F_2$ the second component and $F_3$ the third component.

The second channel group of approximately 14 channels (allowing for conflicts) is transmitted in Channel Group 2, comprising the next three succeeding channel Frames, each Frame consisting of eight bit positions. Normally 6 voice channels would be transmitted in the interval comprising the two channel groups. In the present invention 26 channels or more may possibly be transmitted. A T-1 format framing pulse is transmitted as the 193rd bit of a T-1 frame.

Figure 5:
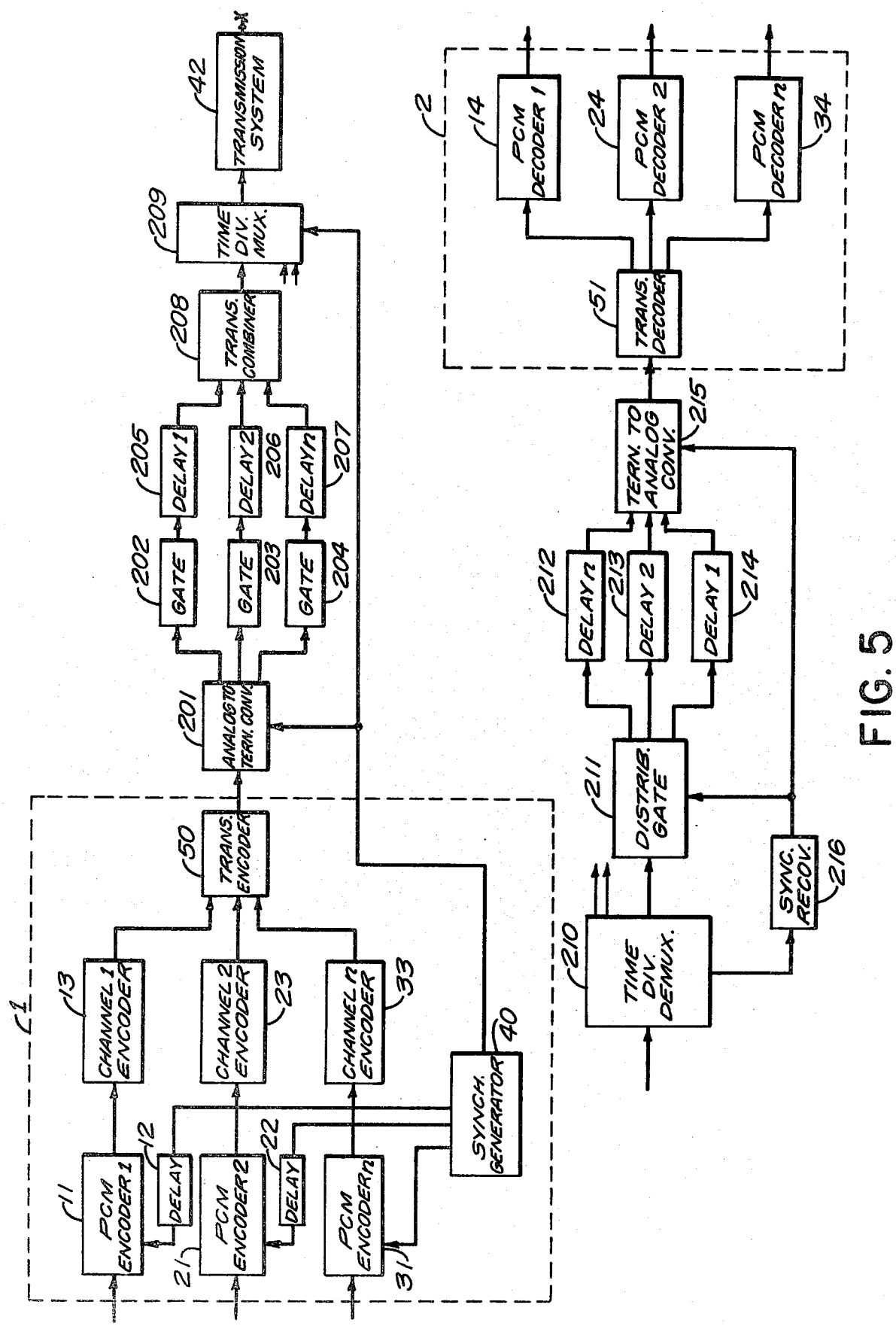
FIG. 5 illustrates one embodiment of the sequential frame multiplexer using analog to digital conversion for transmission.

The diagram in FIG. 5 shows the additional equipment needed to implement the SFDMIC beyond that required for the DMIC. Units 1 and 2 represent the transmit and receive units portrayed in FIG. 1 and FIG. 2. All the units within these boxes perform the same functions as previously described, Unit 1 encodes an analog channel source, which can be a telephone, into a series of pulses at PCM Encoder 11, marks each channel pulse with a characteristic amplitude as at channel encoder 13, and sums these channel pulses from all the channels in transmission encoder 50 bit pulse by bit pulse. The channel code words are stagger synchronous with each other.

The output of encoder 50 is an analog voltage which represents the channel or channels from which the bit pulses originate. This voltage is converted in analog to ternary converter 201. Converter 201 transforms this voltage into a parallel ternary code. Other codes are feasible and also desirable, for example a binary bipolar code may be transmitted over T-1 carrier telephony facilities so a binary code is preferred for that transmission medium. The ternary code may be generated directly or in two stages, first a transformation from analog to a binary parallel code, which can be readily accomplished with an A-D converter, and next a conversion from binary to ternary via a table lookup computer. The resulting output bits are gated to delay units 205–207 via gates 202–204 and then subjected to different delays in units 205, 206 and 207 which are shift registers. The delay in unit 205 will be 0 bit intervals, that in 206 will be 8 bit intervals and that in 207 will be 16 bit intervals. For use with the T-1 format, the delay is increased by 8 for each ternary bit position (or channel Frame Fn). However in general application the delay differential may vary. The delay number corresponds to the bit length of the sampled voice code word.

The delay units 205–207 are shift registers capable of passing the ternary signals which are outputs of 201. Unit 205, for example, consists of separate binary registers for positive pulses and for negative pulses, which occur in ternary coding. A negative pulse will cause a "1" bit to traverse the "negative" binary register. The output of the binary register is converted to a negative going pulse for transmission. The positive pulses cause "1"s to traverse the positive binary register. Its output will remain positive going. The outputs of all the delay units are combined in 208 and form a time sequenced ternary signal. This signal is time multiplexed with similar sequences in time division multiplexer 209 and transmitted through transmission system 42. A 193rd bit is added in multiplexer 209 for frame synchronization. Synchronization is coordinated by signals originating in sync generator 40 which controls the staggered synchronization of the coding units of unit 1.

Signals received from the transmission system 42 (which may be a T-1 facility) go to time division demultiplexer 210. This unit is frame synchronized by signals recovered by sync recovery unit 216, which recognizes an appropriate sequence of 193rd bit pulses. The successive frames of channel 1, are directed to distributor 211, which in turn directs the first frame sequence ($F_1$) to delay unit 212 which provides the longest delay (16 bit intervals in this case) and the second sequence $F_2$ to delay unit 213 which delays 8 bit intervals and $F_1$ to delay unit 214 which delays 0 units (in this case). These signals are fed in parallel to ternary to analog converter 215 which, for each bit interval provides the analog equivalent amplitude of the coder 50 output.

Decoder 51 of unit 2 transforms the output signal from converter 215 to a "1" output on only those channels which caused an output from coder 50 in a manner described previously in this application. There may be one or more channels which may at the same time receive "1"s. The channels sending "1"s are determined by comparison of the converter 215 output amplitude with various voltages in various comparator circuits, as is done in analog to digital converters and as is well known in the state of the art. The "1" and "0" outputs are decoded in each channel decoder 14, 24, 34, etc, into samples of speech, data or into other outputs corresponding to the channel signal inputs in unit 1.

As described previously if more than one channel supplies a "1" bit in a given bit interval the summer 41 output must be the sum of the amplitudes of the several channel outputs each marked with the channel amplitude code. To permit decoder 51 to decode a multiple bit occurrence without error, it is only necessary to select channel marking amplitudes the sum of which will be a non-ambiguous number with respect to the amplitudes used for marking individual channels. This procedure can be used whether two, three or more simultaneous channel bits may occur. However, fewer amplitudes are required when the expectation of more than two simultaneous channel bits is negligible. This is generally the case for low bit probabilities which in turn results from low utilization factors. In this case sufficient code amplitudes will be allowed for all single channel "1" occurrences and all expected combinations of two channel bit occurrences. Not all such combination of two channels may be sufficiently probable to warrant coding, thereby further reducing the required code amplitudes (or numbers).

Figure 6:
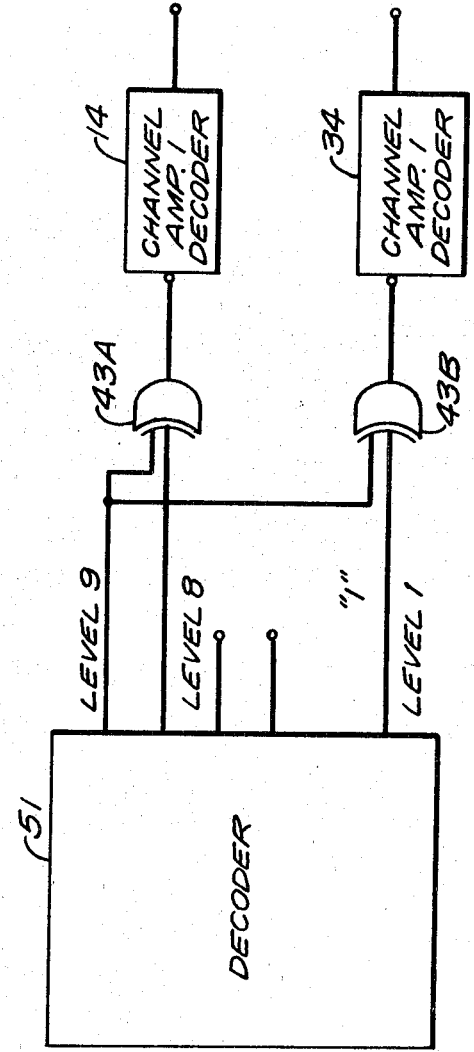
FIG. 6 illustrates a decoder for the sequential frame multiplexer.

When multiple channel occurrences are coded decoder 51 will recognize amplitude levels that identify the two or more channels which should supply a "1" bit to their channel decoders. In this case decoder 51 must supply "1" signals to the two or more channels simultaneously. An illustration of this is shown in FIG. 6 which shows that a separate level 9 output provides "1"s to two channels 1 and 8. Channel two amplitude decoder 34 will also receive a "1" when coder 51 level 1 provides an output. The "Or" unit 43B will pass a "1" to the channel unit 34 when either of these events occur. Similarly 43A will allow either level 8 or level 9 to cause channel 8 amplitude decoder 14 to receive a "1"

thus providing the required simultaneous operation of the two output channels. The remaining channels would, of course, be handled in the same way. In all other respects unit 2 operates the same way as previously described.

In the embodiment of FIG. 5 the transmission encoding was accomplished by (1) marking the channel bits with a predetermined amplitude, (2) summing the predetermined amplitude, and (3) doing an analog to ternary conversion. Decoding was accomplished by (1) comparing input voltages with standard voltages (2) providing discrete outputs and (3) using these discrete outputs to provide bits to one or more channel decoders. Multiple outputs to the decoders were handled by the OR gates shown in FIG. 6.

Figure 7:
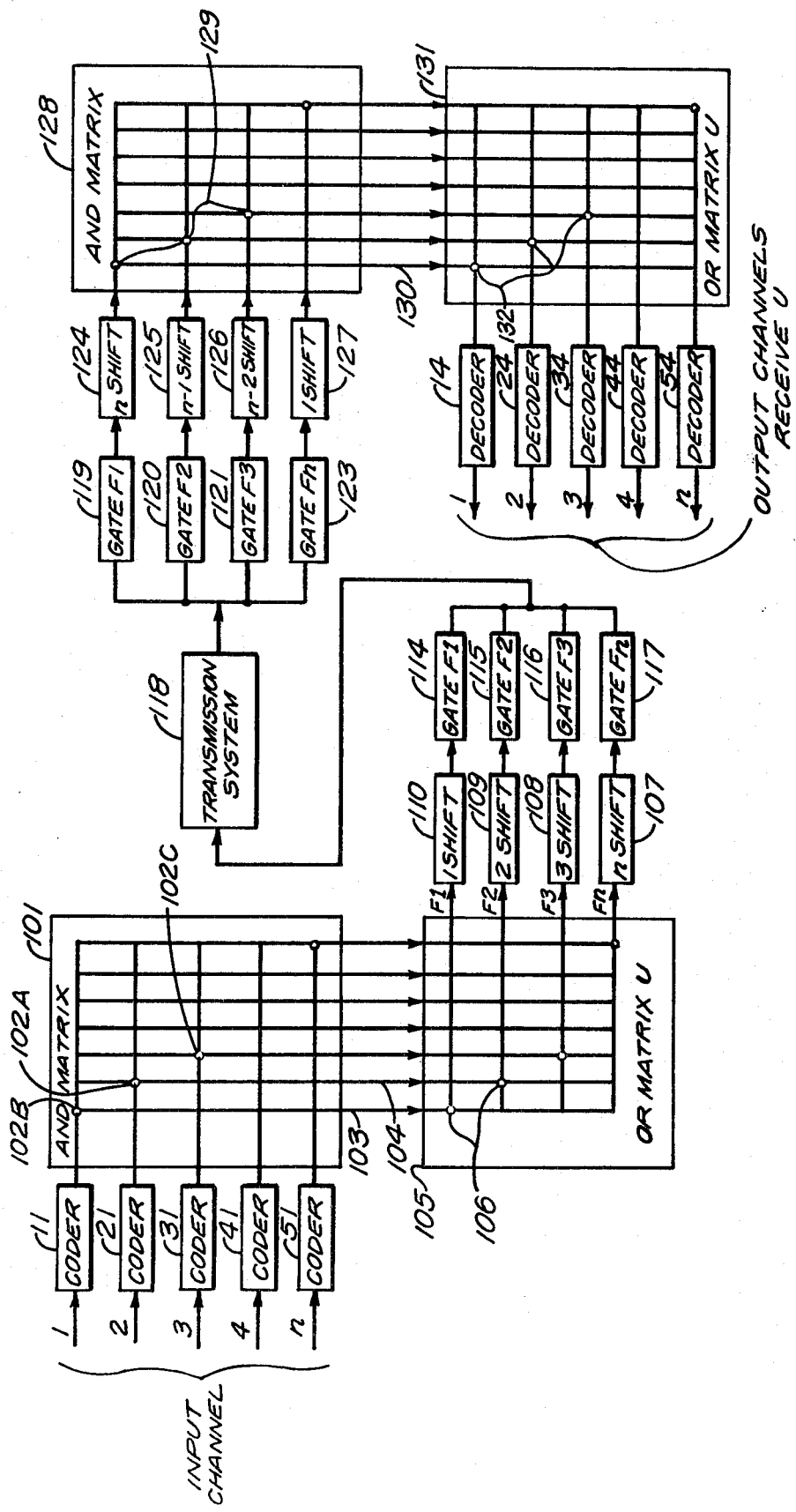
FIG. 7 illustrates another embodiment of the sequential frame multiplexer using array logic components.

In FIG. 7 AND and OR array logic is used for the transmission channel encoding and decoding process. Input channels 1 through n carry analog signals to coders 11-51, as before it being understood that coder 11, as shown in FIG. 7, includes the delay and synchronization circuitry shown in FIG. 1 necessary to provide bit staggering as described above. The coders convert the analog signals to digital signals and the encoder outputs are sampled at a rate of 1.544 MBs (T-1 carrier transmission rate). The staggered binary output signals from the encoders are applied to AND matrix 101, each coder output being fed to a separate input line to matrix 101. At the intersection of each input line, with each vertical output line 103 and 104, AND gates are connected when outputs to lines 103 and 104 are desired. For example, if an output on 103 is desired, if and only if an output "1" pulse is present in channel 1 then an AND gate 102B is connected at the intersection of line 103 and the channel 1 input it being understood that in this instance AND gate 102B would be a two input AND gate having both inputs connected to channel 1. If an output is desired only when there is a signal from both channel 1 and channel 2, then AND gate 102A would be connected which will be responsive to the signals from channels 1 and 2 to generate an output for example on line 104. The remaining AND gates in the AND matrix, 102A-102C being shown by way of example, would operate in a similar manner.

In general a vertical output line, such as 103 or 104, will be required for each channel or combination of channels in which simultaneous pulses are expected. Analysis of probabilities of such simultaneous occurrences indicated that only combinations of two channels will require a line output from 101, and not all combinations of two channels will be sufficiently frequent to require outputs. All single channels will, of course, have outputs, it being understood that outputs generated by channel combinations will be separate from single channel outputs and that the single channel outputs will be suppressed if and only if they form part of a combination that is generating a separate output signal resulting from the combination.

The output signals from AND matrix 101 are applied to OR matrix 105. Diodes are connected at appropriate intersections such as 106, between input lines from AND matrix 101 and the horizontal output lines from OR matrix 105. There are as many horizontal lines as there are required transmission code positions. A ternary code 1, 0, −1 or a binary bipolar code may be used for transmission on T-1 lines. Other coding modules may be used with appropriate adjustment to the logic design. The diodes at 106 permit a pulse to be transmitted from the vertical lines to the horizontal lines whenever there is a pulse on the vertical lines. Although not shown, it is of course understood that more than one horizontal line may be connected to a single vertical line via diodes. The net result is that a parallel code is created whenever single pulses are present on the vertical lines. Each of these codes is distinctive for each vertical line thus permitting a unique binary code for all single channels which have outputs and a unique binary code for all combination of channels in which simultaneous pulses are either expected or received. This binary code is readily converted to ternary code by conversion of some of the pulses into negative pulses. The simplest way to do this is to provide two horizontal lines for each Frame Code position, one for positive and one for negative code pulses. The vertical lines are then connected by diodes to the line supplying the required code pulse polarity. The outputs of the lines supplying pulses which are to be transmitted negative (negative pulse line) are connected to a polarity inverter. The positive and negative pulses for each frame position are then combined.

The output pulses from OR matrix 105 are applied to delay shift registers 107 through 110. The differential delay between these registers is one channel word (or Frame), that is if a channel word (bit sequence per analog sample) is 8 bits then shift register 109 is 8 bits longer than shift register 110, 108 is 8 bits longer than shift register 109 and so forth. Thus digit position F2 is delayed 8 bits with respect to digit position F1 when they respectively reach gates 115 and 114. Gates 114 and 115 open sequentially so that the bits from Frame F1 will be transmitted first through gate 114 and bits from Frame F2 through gate 115 after all F1 bits have been transmitted through gate 114. Similarly gates 116 and 117 transmit F3 bits and Fn bits in turn. The output bits from gates 114-117 are transmitted through transmission system 118 which can be a T-1 carrier transmission system or other wideband cable or wireless media. The T-1 System is particularly suitable for transmitting "1", "0" and "−1" pulses. The shift registers 107 through 110 must, of course, be equipped to transmit both +1 and −1 pulses from the ternary code with the positive pulse horizontal lines of OR matrix 105 being connected to the positive shift registers of 107 through 110 and the negative pulse horizontal lines of 105 connected to the negative binary shift registers. Only the output of the negative shift registers are inverted as discussed before.

Gates 119 through 123 operate at the receiving end of the multiplexer of the instant invention to direct successive words to shift registers 124 through 127, which serve to realign the original parallel code for simultaneous entry into AND matrix 128. Not shown is the sign bit transmission and recovery circuits which designates the start of word frames but it is standard in T-1 channels to insert a 193rd after the transmission of 24 eight bit intervals. This would be the method used in conjunction with the present system. The AND matrix 128 provides a single pulse output to a vertical line when a particular pulse or combination of pulses is received at the AND unit connected to that vertical line (such as 130). Thus there will be as many outputs (vertical lines) and AND matrix 128 as code combinations provided by the n digital ternary code (consisting of bits F1 through Fn).

The outputs 130 of AND matrix 128 enter OR matrix 131. When a pulse is present on a given line, such as line 130, a connected diode or diodes 132 transfer the pulse to one or more of the horizontal "channel" lines. These pulses correspond to the pulses originating from channel encoders 11 through 51 in bit time interval and are fed to channel decoders 14 through 54. These decoders transform the 8 bit words (8 bits being the example used herein) into analog samples so that n analog output channels result. These, of course, are voice frequency signals.

The above completely describes the implementation of the instant invention using array logic. It is desirable to provide separate implementation for the positive and negative coding signals in the channels as this reduces the probability of conflict between channels by a factor of 4 i.e. the probability of either a + or a − bit is one-half of the probability of a bit and the probability of pairs of conflicting bits is the square of the probability of a bit. It should also be noted that all of the functions performed by units 101 through 131 (less the transmission system 118) can be performed by a properly programmed sequential digital processor having a higher clock rate than the transmission rate.

The primary characteristic of the SFDMIC is that the analog channel capacity increases at $3^{Fn}$ for ternary transmission whereas the transmission channel requirement increases as $F_n$, thus the bandwidth utilization factor increases as $3^{Fn}/Fn$. If the AND and OR matrices discussed above are equipped to handle all single and multiple channel pulse occurrences (i.e., all pulse conflicts, this improvement can be realized error free. However, owing to the low utilization factor discussed above and the infrequency of many of the encoded bits only single channels and pairs of channel pulses normally need be accounted for. This greatly reduces the logic circuits required in the matrices. Further only pairs of the most frequent bit positions need be provided for as the penalty for not transmitting multiple pulses (such as pairs) is a single transmission error. A reasonable number of transmission errors may be tolerated without loss of intelligence in voice and for data these errors can also be economically and readily corrected by known coding techniques.

It should be noted that SFDMIC type coding does not increase the power required for good Signal to Noise (S/N) performance. The S/N requirement is determined (per bit interval) by that required by a three level code, regardless of the number of channels transmitted.

Further reduction of errors caused by coincidences is achieved by separate transmission of plus and minus channel pulses.

Although specific embodiments of this invention has been shown and described, it will be understood that various modifications may be made without departing from the spirit of the invention.

Figure 8:
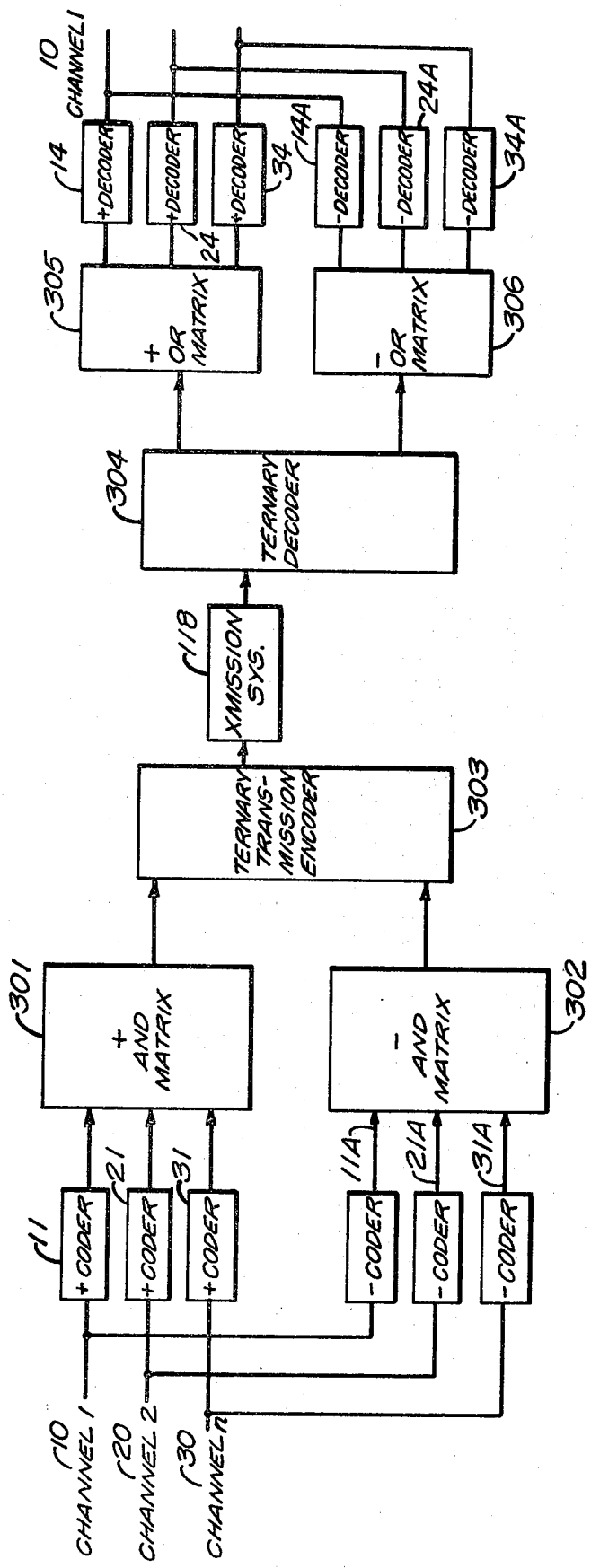
FIG. 8 is an embodiment of the sequential frame multiplexer using separate plus and minus signal encoding.

In accordance with another aspect of the instant invention, it is also advantageous to utilize a positive and negative encoder for the analog input signal. More particularly the voice analog signal is an alternating current and has equal positive and negative values. Over reasonably small intervals of time of symmetrical probability density function in amplitude is valid. Data modems designed to operate over telephone lines also have this characteristic. A channel encoder may be replaced by a positive encoder and a negative encoder, each responsive to only positive or negative values of the incoming signal. The configuration is shown in FIG. 8. Except for the separate encoding and decoding the SFDMIC operates like FIG. 7.

The separate plus and minus encoding reduces the probability of bit coincidence by halfing the probability of bits which may conflict, since plus or minus signals have only one-half of the signal PDF. Additionally, the number of channels encoded by the plus encoder is one-half of the number of channels and similarly the number of channels encoded by the minus encoder is one-half the number of channels.

The net result of this method is to reduce the probability of error. In this case of the probability of two simultaneous pulses (pairs) the probability is reduced by a factor of 16 against not separating the sign encoding. This follows from $$P_e2 = \frac{(n/2)((n/2) - 1)P_B2}{2} \text{ - (Seperate)}$$

vs.

$$P_e2 = \frac{(n)(n - 1)(2P_B)^2}{2} \text{ - Not separate}$$

Furthermore this method does not require the sending of a sign bit. This saves one position of code which enhances the bandwidth improvement. This improved performance is brought about by increasing the number of channel encoders and transmission encoding capacity.

An embodiment of the invention which includes this method is shown in FIG. 8. Coders 11, 21, 31, etc. are similar to coders of the same designation shown in FIG. 7 except that these coders sample positive going signals only. Coders 11A, 21A, 31A, etc. sample negative going signals only. Coder 11 is a seven bit coder which provides codes for $2^7$ or 128 positive sample amplitudes, and coder 11A is an encoder which encodes seven bits and provides for 128 negative sample levels (or discrete amplitudes). Coders 11 and 11A are connected to the same channel 10 which may be a direct connection to a telephone as shown in FIG. 1, or, a data modem operating on voice frequency lines. AND matrix 301 performs the same function as AND MATRIX 101 in FIG. 7 except it only receives inputs from positive encoders 11, 21, and 31. AND Matrix 302 is identical in function to 301 except it receives only inputs from negative encoders 11A, 21A, 31A, etc. These separate matrix units 301 and 302 provide separate outputs to the transmission encoders 303. Encoder 303 contains an OR Martrix identical in function to OR MATRIX 105 of FIG. 7, and also includes shift registers and gates of the same function and configuration as shift registers 107 through 110, and gates 117 through 114 to provide the proper time sequential output to transmission system 117 from the outputs of the OR MATRIX. It is important to note that transmission encoder 303 will encode a positive signal from a channel unit 10 separately from a negative signal from the same channel, whereas the transmission system of FIG. 7 does not. While more codes ae required by the present method of FIG. 11, the benefit is the substantial reduction of conflicts between positive signals and negative signals.

Ternary decoder 304 provides the same functions as the gates 119 through 123, shift registers 123 thru 127 and AND matrix 128 in FIG. 7 to provide separate outputs for each of the different transmitted codes. Separate outputs are provided to OR MATRIX 305 and 306. The outputs going to 305 are those originating from positive encoders 11, 21, 31, etc. and those to 306 are derived from negative encoders 11A, 21A, 31A, etc. The outputs of 305 are supplied to decoders 14, 24, 34, etc., which supply a positive outgoing analog signal to outgoing channels 10, 20, 30, etc, at the receiver.

Similarly the outputs of matrix 306 are connected to negative decoders 14A, 24A, 34A, etc. and these decoders provide negative output analog signals to the outgoing channels. Decoders 14 and 14A are connected to the same output channel in such a way that the decoders are additive so that the output channel provides the correct positive and negative outgoing analog signal. Coders 24 and 24A are similarly connected to channel 20, coders 34 and 34A to channel 30, etc.

The channel encoding used in SFDMIC may be done in an alternative manner to that given in Table III. More particularly, SFDMIC may employ compressive encoders which first apply a logarithmic law to the input signals. This type of encoding is done to encode a wide range of sample amplitudes with the fewest number of bit positions. This encoding may also result in more than one "1" bit per sample word.

A common method of compressive encoding for voice divides the positive and negative amplitude range into eight segments (a total of 16 segments), as discussed previously. These segments double in size from the lowest value segment to the next highest value segment. Each of these segments are quantized into eight equal parts so that the quantization interval doubles with each segment. Thus each segment is designatable by a three bit code and the quantized subdivisions are also designated by three bits. The resulting codes are

TABLE XIII

| + or − Segment | Code |
|---|---|
| 0 | 000 abc, |
| 1 | 001 abc |
| 2 | 010 abc |
| 3 | 011 abc |
| 4 | 100 abc |
| 5 | 101 abc |
| 6 | 110 abc |
| 7 | 111 abc | a, b, c = 0 or 1

A sign bit is not required when positive or negative encoders are used, as described above. The probabilities of a voice amplitude being in any of the segments is given by Table II, or when the utilization factor is included, by Table IV. From this probability the probability of a bit $P_B$ can be determined as follows:

The probabilities of the a,b,c bits are, in the worst case, $0.5\ P_{SL}$, where $P_{SL}$ is the probability of the presence of the L th segment. The reason for the 0.5 is that the LSB of the segment subdivision designator always samples half of the probability area, and hence, must be half as probable as the area. The shape of the area may cause the higher level bits to be less probable, so that 0.5 $P_{SL}$ is worst case for any a, b, or c bit. Thus the probabilities of the a,b,c, bits are:

TABLE XIV

| BIT | $P_B$ |
|---|---|
| $a_0, b_0, c_0$ | .0097 |
| $a_1, b_1, c_1$ | .0059 |
| $a_2, b_2, c_2$ | .0058 |
| $a_3, b_3, c_3$ | .0029 |
| $a_4, b_4, c_4$ | .00045 |
| $a_5, b_5, c_5$ | Negligible |
| $a_6, b_6, c_6$ | Negligible |

TABLE XIV-continued

| BIT | $P_B$ |
|---|---|
| $a_7, b_7, c_7$ | Negligible |

$a_o$ means a in 0 segment or level

The last four levels can be, for practical purposes, be ignored.

Code groups a b c will consist of eight combinations of "0"s and "1"s, ranging from 000 to 111. Each of these codes is approximately equiprobable. There are twelve possible "1"s in these eight codes or an average of 12/8 = 1.5 "1"s per code. Since there are three bit positions per code the average probability of a "1" in any code position is 1.5/3 = 0.5. Therefore the Probability $P_B$ of the bits when used in these codes is 0.5 times the probability of the existence of the single bit shown in the previous table, and is given below

TABLE XVII

| BIT CODE | $P_B$ of a "1" |
|---|---|
| $a_0\ b_0\ c_0$ | .0048 |
| $a_1\ b_1\ c_1$ | .0030 |
| $a_2\ b_2\ c_2$ | .0029 |
| $a_3\ b_3\ c_3$ | .0015 |
| $a_4\ b_4\ c_4$ thru $a_7\ b_7\ c_7$ | Negligible |

The frequency of "1" bits in level segment designators is the main concern, the code with the least "1"s being used for the most frequent levels.

The probabilities of a "1" in these segment designator bit positions is then the probability of a segment times the probability of "1"s in any position of the designator code. Thus the probability of a bit $P_{BD}$ in any designator position is set forth below

TABLE XV

| Segment | "1"s Prob = $P_{BD}$ | |
|---|---|---|
| 000 | .0195 × 0 | 0 |
| 001 | .0119 × ⅓ | .003 |
| 010 | .0059 × ⅓ | .003 |
| 100 | .0059 × ⅓ | .002 |
| 011 | .0009 × ⅔ | .0004 |
| 101 | .000017 × ⅔ | Negligible |
| 110 | Negligible × ⅔ | Negligible |
| 111 | Negligible × 3/3 | Negligible |

The fourth and fifth segment code designators are interchanged to reduce the number of "1"s in the more frequent code. Stagger synchronization of the input channels is used so that a "1" in any position of the designation code may appear in any transmission position but the probability of its presence is averaged over three possible bit positions. This is why this probability, for example, is 1/3 for segment 010.

The staggered synchronization causes the transmission bit position to contain a composite of the different channel bit positions (See, Table V). Even when all channels are actively operating only a fraction of the channels will provide "1"s. An average bit probability may be computed by considering a typical case which is shown in FIG. 9. This contemplates that each of eight channels will be operating with a talker of a different segment in each channel. If a larger number of channels are operating the same pattern would be repeated. The channel bit occurrences with time are shown in the upper diagram while the corresponding bit probabilities are shown in the lower diagram. It will be noted that there are only three instances out of 48 in a span of six bit positions where the probability of a bit is as high as 0.004. In more than half the instances the bit probability of "1" is zero.

When the probabilities in each column of FIG. 9 are averaged, the average probability varies between 0.001 and 0.0015. This average probability may be taken as the expected value of probability of a "1" bit from any connected channel. This average probability takes into account a reasonable spread among weak, average and strong talkers, because the connected channels are uniformly distributed among the amplitude level segments.

A worse case is one in which all channels operate in segment 0 which includes the bits of highest probability. Six channels or multiples thereof would show an average "1" bit probability of 0.002 because the segment identifying bit probabilities are 0 and occur half the time. Channel bit position staggering yields a uniformly low bit probability in each bit interval.

The resulting probability $P_B$, or the average probability of a "1" bit at a particular word code position of any connected channel is, conservatively, $P_B = 0.002$ This value is to be considered present in each box of the lower figure of FIG. 9.

This probability is used to determine the expected number of bit "1" coincidences in a group of incoming channel signals, knowing the number of combinations of channel signals. This bit coincidence is an error rate or a measure of possible distortion of the voice signal. However, if a message is sent informing the receiver of the coincidence, no error or distribution is incurred. The expressions for the probability of double and quadruple triple coincidences is given below:

$Pe_1 = n_p P_B^2$ (double)

number of pairs of coincident channel bits $n_p = \dfrac{n(n-1)}{2}$ $n$ = number of channels $Pe_2 = Pe_2 = n_t P_B^3$ (triple)

number of triple coincident channel bits $n_t = \dfrac{n(n-1)(n-2)}{6}$ $Pe_3 = n_q P_B^4$ (Quadruple)

number of quadruple coincident channel bits $n_q = \dfrac{n(n-1)(n-2)(n-3)}{24}$ The design strategy is to multiplex the largest number of channels for a given performance provided that a given channel error rate is not exceeded. Performance is judged on the number of channels serviced by the multiplexer divided by the number handled in the same time space by for example a T-1 line. Table XVI gives values of $Pe_1$, $Pe_2$, and $Pe_3$ for several values of n

TABLE XVI

| | | $P_{B1} = .002$ | | | | |
|---|---|---|---|---|---|---|
| | Pairs | | Triples | | Quadruples | |
| Channels n | $n_p$ | $Pe_1$ ($P_{B2} = 4 \times 10^{-6}$) | $n_t$ | $Pe_2$ ($P_{B3} = 8 \times 10^{-9}$) | $n_q$ | $Pe_3$ ($P_{B4} = 16 \times 10^{-12}$) |
| 3 | 28 | $1 \times 10^{-4}$ | 72 | $2 \times 10^{-7}$ | 70 | $1 \times 10^{-9}$ |
| 8 | | | | | | |
| 10 | 45 | $2 \times 10^{-4}$ | | | | |
| 20 | 180 | $8 \times 10^{-4}$ | 1140 | $9 \times 10^{-6}$ | 4845 | $8 \times 10^{-8}$ |
| 24 | 276 | $1 \times 10^{-3}$ | 2024 | $1.5 \times 10^{-5}$ | | |
| 40 | 780 | $3 \times 10^{-3}$ | | | | |
| 48 | 1128 | $4 \times 10^{-3}$ | 17296 | $1.3 \times 10^{-4}$ | 194580 | $3 \times 10^{-6}$ |
| 100 | 5050 | $2 \times 10^{-3}$ | 161700 | $1.3 \times 10^{-3}$ | 3921225 | $6 \times 10^{-5}$ |

In Table XVII, the error probabilities ae recalculated replacing n by n/2 (see separate encoding of plus and minus, described above.

TABLE XVII

| n | $n_p$ | $P_{e1}$ | $n_t$ | $Pe_2$ | $n_q$ | $Pe_3$ |
|---|---|---|---|---|---|---|
| 8 | 6 | $2.5 \times 10^{-5}$ | 4 | $3 \times 10^{-8}$ | 1 | $1.5 \times 10^{-11}$ |
| 10 | 10 | $4 \times 10^{-5}$ | 45 | $4 \times 10^{-7}$ | 5 | $1 \times 10^{-10}$ |
| 12 | 15 | $6 \times 10^{-5}$ | | | | |
| 20 | 45 | $2 \times 10^{-4}$ | 120 | $1 \times 10^{-6}$ | 210 | $1.3 \times 10^{-9}$ |
| 24 | 66 | $2.5 \times 10^{-4}$ | | | | |
| 40 | 190 | $8 \times 10^{-4}$ | 1140 | $1 \times 10^{-5}$ | 4845 | $8 \times 10^{-8}$ |
| 48 | 276 | $1 \times 10^{-3}$ | 2024 | $1.5 \times 10^{-5}$ | 10626 | $1.5 \times 10^{-7}$ |
| 100 | 1225 | $5 \times 10^{-3}$ | 19600 | $1.5 \times 10^{-4}$ | 230300 | $3.7 \times 10^{-6}$ |

The channel error probability Pce is the error probability $P_e$ divided by the number of channels. An acceptable $P_{ce}$ is in the order of $10^{-4}$. We arrive at this rate in the following way. Assume voice channel samples occur at 8000 per second. Attributable channel bit errors at a rate of $10^{-4}$ will cause one of these samples to be wrong once every 10,000 times or once every 10/8 of a second. However 6 successive bits are required for each sample so the sample error can occur once every 10/8×6, or, every 0.2 second. This rate is so low that it will not be passed by the reconstruction filter, since it is only 5 times a second. Furthermore, the error bit will cause a significant error in only a few of the cases so that a better estimate is one-half of this or 2.5 seconds.

Channel error rates are given in Table XVIII for the transmission error rates given in Table XX for $Pe_1$

TABLE XVIII

| Channels n | Channel Error Rate $P_{ce}$ | Band Width Improvement Factor BWI | |
|---|---|---|---|
| 8 | $3 \times 10^{-6}$ | (8/3)8/7 = | 3.05 |
| 10 | $4 \times 10^{-6}$ | (10/3)8/7 = | 3.81 |

TABLE XVIII-continued

| Channels n | Channel Error Rate $P_{ce}$ | Band Width Improvement Factor BWI |
|---|---|---|
| 12 | $5 \times 10^{-6}$ | $(12/3)8/7 = 4.51$ |
| 20 | $9 \times 10^{-6}$ | $(20/4)8/7 = 5.71$ |
| 24 | $1 \times 10^{-5}$ | $(24/4)8/7 = 6.86$ |
| 40 | $2 \times 10^{-5}$ | $(40/4)8/7 = 11.43$ |
| 48 | $2.4 \times 10^{-5}$ | $(48/5)8/7 = 10.97$ |
| 100 | $5 \times 10^{-5}$ | $(100/5)8/7 = 22.86$ |

These rates are satisfactory up to at least 100 channels with out resorting to transmission of codes for doubles but require 2n transmission codes. An order of magnitude improvement can be achieved by transmission of codes for coincident pairs, if this is required, for 40 channels and above. However this entails loss of bandwidth improvement to allow for the extra $2n_p$ transmission codes.

The bandwidth improvement (BWI) for these cases is given in Table XVIII. The BWI allows for transmitting double the number of channels, to allow for transmitting plus and minus channels separately. While only six bits are required for the segmented compression code we have used, we have allowed for a possible seventh bit. Thus the BWI figures are conservative.

Bandwidth improvement is calculated by dividing the number of input voice channels carried by the SFDMIC by the number of voice channels carried by the transmission system if ordinary PCM channels were using the same time intervals. The SFDMIC requires only enough transmission channels to carry the designation bits for the channel nunmbers (in ternary code for T-1). Thus for 40 channels, allowing for separate positive and negative designations, 80 codes are required. This number of codes needs only a 4 term ternary code and thus only 4 channels.

In addition less bit positions are required for the proper amplitude designation (no sign bit is required). This takes a fraction of the time required for a standard 8 bit T-1 PCM channel. The result is $$BWI = \frac{\text{Voice Channels}}{\text{Transmission Channels}} \times \frac{PCM \text{ Word}}{SFDMIC \text{ Word}}$$

For example, 40 channels transmitted by ternary code will provide a Bandwidth Improvement of $$BWI = (40/4) \times (8/7) = 11.43$$

assuming a 7 bit SFDMIC word is required.

If the transmission channel is two level (binary), then seven channels are required ($2^7 = 128$) to transmit 40 channels. However, according to Table XVIII, since the error rate is less than $10^{-4}$, 64 channels could be transmitted. The result is $$BWI = (64/7) \times (8/7) = 10.45$$

An eight segment, 8 subdivision code has been discussed here. This code requires six bits. Seven bits would permit 16 segments each with 8 quantization intervals. Such a code which would provide the same compression factor has been analyzed. The greater segmentation provides even lower average $P_B$ (approximately ½ of the six bit code), so that greater channel handling is possible than that shown for the six bit code, for the same channel error rate.

Although specific embodiments of this invention have been shown and described, it will be understood that various modifications may be made without departing from the spirit of this invention.

I claim:

1. A digital communications system comprising a plurality of input channels for carrying information signals, means associated with each input channel for serially encoding the information signals into a sequence of multibit digital words, timing means, controlling each of the encoding means, for ordering the bit position of each multibit digital word such that a predetermined bit in each word is presented at different times to outputs of each of the encoding means, first means for converting the multibit digital words from each of the encoding means into multibit digital code words, means for multiplying each bit of each code word with a different analog voltage, means for summing the multiplied different analog voltages, second means for converting the summed analog voltage into transmission code words, means for ordering the transmission code words into a plurality of successive transmission frames and means for transmitting the successive transmission frames over a communications highway to a remote location.

2. A digital communications system comprising a plurality of input channels for carrying information signals, means associated with each input channel for encoding the information signals into a sequence of multibit digital code words, means for multiplying each bit of each code word with a different analog voltage, means for summing the multiplied different analog voltages, means for converting the summed analog voltages into transmission code words, means for ordering the transmission code words into a plurality of successive transmission frames and means for transmitting the successive transmission frames over a communications highway to a remote location.

3. A digital communications system comprising a plurality of input channels for carrying information signals, means associated with each input channel for encoding the information signals into a sequence of multibit digital code words, means for multiplying each bit of each code word with a different analog voltage, means for summing the multiplied different analog voltages, means for converting the summed analog voltages into ternary code words, means for subjecting selected and different bits of the ternary code words to different amounts of delay, means for ordering the delayed ternary code words into a plurality of successive transmission frames and means for transmitting the successive transmission frames over a communications highway to a remote location.

4. A digital communications system in accordance with claim 1, wherein said second converting means converts said summed analog voltages into ternary code words, said second converting means further including means for subjecting selected and different bits of said ternary code words to different amounts of delay.

5. A digital communications system in accordance with claim 4, wherein there is further included means for ordering said delayed ternary code words into a plurality of selective transmission frames and means for transmitting the successive transmission frames over a communications highway to a remote location.

6. A digital communications system comprising, a plurality of input channels for carrying information signals, means associated with each input channel for encoding said information signals into multibit digital words, timing means, controlling each of said encoding means for ordering the bit position of each multibit digital word, means for converting said ordered multibit digital words into multibit transmission code words, each bit of said multibit transmission code words identifying particular information signal carrying input channels, and means for transmitting said multibit transmission code words over a communications highway to a remote location.

7. A digital communications system in accordance with claim 6 wherein said transmitting means includes means for ordering said multibit transmission code words into a plurality of successive transmission frames and means for applying said successive transmission frames to said communications highway.

8. A digital communications system in accordance with claim 6 wherein said converting means includes means for identifying a particular information signal carrying input channel and means for identifying a plurality of input channels simuntaneously carrying information signals.

9. A digital communications system in accordance with claim 7 wherein there is further included means located at said remote location for receiving and converting said successive transmission code words into received multibit channel identification words and means for decoding said received multibit channel identification words into said information signals carried on said plurality of input channels.

10. A digital communications system in accordance with claim 8 wherein said identifying means includes a plurality of AND and OR circuits.

11. A digital communications system in accordance with claim 7 wherein said ordering means includes shift register means for imparting varying amounts of delay to predetermined groups of said bits in said multibit transmission code words and gating means for selectively applying said predetermined groups of bits of said communications highway.

12. A digital communications system comprising, a plurality of input channels for carrying information signals, said information signals varying in amplitude, means associated with each input channel for encoding said varying amplitude information signals into multibit digital words, the frequency of occurrence of selected bits in said multibit digital words being dependent on the amplitude of said information signals, timing means, controlling each of said encoding means for ordering the bit position of each multibit digital word and for minimizing the simultaneous occurrence of said selected bits, means for converting said ordered multibit digital words into multibit transmission code words, said selected bits contained within said multibit transmission code words identifying particular information signal carrying input channels and means for combining said transmission code words into transmission frames and for applying said transmission frames to a communications highway connected to a remote location.

13. A digital communications system in accordance with claim 12 wherein there is further included means for detecting the simultaneous occurrence of a plurality of said selected bits and means responsive to said detecting means for generating a unique transmission code word identifying the simultaneous occurrence of said plurality of selected bits.

14. A digital communications system in accordance with claim 13 wherein there is further included at said remote location means for receiving and converting said transmission code words into received multibit channel identification words and means for decoding said received multibit channel identification words into said varying amplitude information signals carried on said plurality of input channels.

15. A digital communications system in accordance with claim 12, wherein said converting means includes a plurality of AND and OR circuits.

16. A digital communications system in accordance with claim 12, wherein said combining means includes shift register means for imparting varying amounts of delay to predetermined groups of said bits in said multibit transmission code words and gating means for selectively applying said predetermined groups of bits to said communications highway.

* * * * *